O. R. HANSON.
TRACTION WHEEL.
APPLICATION FILED JAN. 4, 1919.
1,338,299.
Patented Apr. 27, 1920.
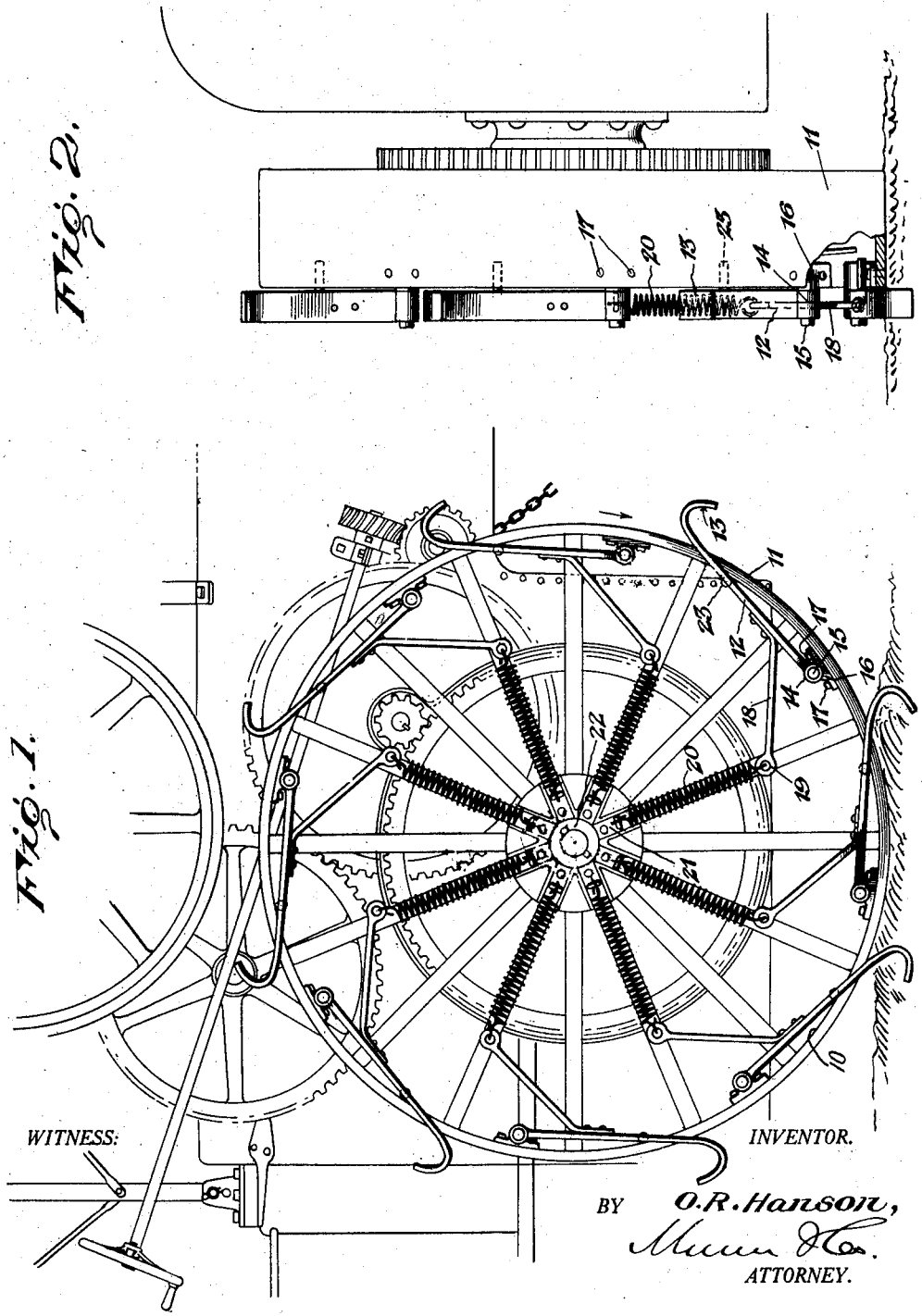

UNITED STATES PATENT OFFICE.

OLE R. HANSON, OF CADOGAN, ALBERTA, CANADA.

TRACTION-WHEEL.

1,338,299.   Specification of Letters Patent.   Patented Apr. 27, 1920.

Application filed January 4, 1919. Serial No. 269,724.

*To all whom it may concern:*

Be it known that I, OLE RASMUS HANSON, a citizen of Canada, and a resident of Cadogan, in the Province of Alberta, Dominion of Canada, have made certain new and useful Improvements in Traction-Wheels, of which the following is a specification.

My present invention relates generally to traction wheels, and more particularly to traction wheels of traction engines, whose wheels as now formed have broad, flat treads, my object being the provision of simple effective means capable of ready attachment to wheels of this nature, for the purpose of generally improving traction in connection with either hard or soft ground or traction surface which may be readily installed, and which is capable of ready repair and efficient action at all times.

In the accompanying drawing illustrating my present invention:—

Figure 1 is a side view illustrating the practical application of my invention, and, Fig. 2 is a front elevation thereof.

Referring now to these figures, my invention includes certain improvements in connection with traction wheels indicated generally at 10 in Fig. 1, and having a broad flat tread band, as seen particularly at 11 in Fig. 2. In connection with such traction wheels my invention proposes an annular series of ground gripping arms 12, each of which has one end bent to form an outwardly turned terminal hook 13, the extremity of which reverts with respect to the direction of movement of the wheel in use, so as to provide for effective grip and traction in connection with either hard or soft earth or other traction surface, particularly in view of the yielding qualities of these gripping arms.

Each of the gripping arms 12 is pivoted at its end opposite the hook 13 and is for this purpose provided with a transverse tubular bearing 14 pivotally engaging a stud 15 projecting laterally from a bearing block 16, the latter being rigidly secured by bolts 17 and the like to the inner surface of the wheel tread 11, as clearly seen by a comparison of Figs. 1 and 2.

Each of the arms 12 is moreover provided at a point intermediate its ends with an angularly projecting lever 18 having at its free end an eye 19 for the reception of one end of a coil spring 20, the opposite end of which is similarly connected to one of the arms 21 of a spider 22 secured upon the hub of the wheel 10 in any suitable manner. It is thus obvious that the construction of my invention as described provides for the mounting of an annular series of the gripping arms 12 around the wheel 10 adjacent its periphery, and movable in a plane laterally beyond one side of the wheel, the several springs being disposed radially with respect to the hub of the wheel by virtue of the angular projection of the levers 18 with respect to the gripping arms. It is furthermore obvious that the springs 20 normally operate to maintain the several gripping arms 12 at the outer limits by their pivotal movement with respect to the bearing blocks 16, and hence with respect to the tread of the wheel, and that these springs further operate to tension the inward movement of the arms as the ground or other traction surface is engaged so as to draw the terminal hooks 13 into effective gripping relation with such traction surface.

Each of the arms 12 has a laterally projecting stop piece 23 at a point between lever 18 and the terminal hook 13, which engages the inner surface of the tread 11 of the wheel in the outermost position of the arms and thus prevents their movement outwardly beyond the effective normal position shown around the upper portion of Fig. 1.

I claim:—

1. A traction wheel having an annular series of gripping arms disposed in a plane laterally beyond one side of the tread wheel, each of said gripping arms being pivoted to the wheel at one end and having a terminal hook at its opposite end, a lever projecting from each of said arms intermediate the ends thereof, and a spring for each of the arms connected at one end to the lever thereof and at the opposite end to the wheel.

2. A traction wheel having its tread provided with an annular series of bearing blocks secured to the inner surface thereof and provided with pivot studs projecting laterally beyond one side of the tread, a series of gripping arms journaled at one end upon the said pivot studs and having terminal hooks at their opposite ends, inwardly projecting angular levers secured to said gripping arms intermediate the ends of the latter, and a series of springs radiating from the hub of the wheel and connected at their outer ends to the said levers.

3. A traction wheel having its tread provided with an annular series of bearing blocks secured to the inner surface thereof and provided with pivot studs projecting laterally beyond one side of the tread, a series of gripping arms journaled at one end upon the said pivot studs and having terminal hooks at their opposite ends, inwardly projecting angular levers secured to said gripping arms intermediate the ends of the latter, and a series of springs radiating from the hub of the wheel and connected at their outer ends to the said levers, each of said gripping arms having a laterally projecting stop for engagement with the wheel tread to limit outward movement of the arm.

OLE R. HANSON.

Witnesses:
J. E. MURDOCK,
J. McCARTNEY.